United States Patent
Van Etten et al.

(10) Patent No.: US 7,716,084 B2
(45) Date of Patent: *May 11, 2010

(54) INFORMATION TRANSLATION COMMUNICATION PROTOCOL

(75) Inventors: William R. Van Etten, Mendham, NJ (US); Corey Prator, Spring, TX (US)

(73) Assignee: ePlus Inc., Herndon, VA (US)

( * ) Notice: Subject to any disclaimer, the term of this patent is extended or adjusted under 35 U.S.C. 154(b) by 1253 days.

This patent is subject to a terminal disclaimer.

(21) Appl. No.: 11/124,380

(22) Filed: May 9, 2005

(65) Prior Publication Data

US 2005/0261983 A1    Nov. 24, 2005

Related U.S. Application Data

(62) Division of application No. 09/348,693, filed on Jul. 7, 1999, now Pat. No. 6,892,185.

(51) Int. Cl.
    *G06F 17/60*     (2006.01)
(52) U.S. Cl. .......................................... 705/26; 705/27
(58) Field of Classification Search .................. 705/26, 705/27
    See application file for complete search history.

(56) References Cited

U.S. PATENT DOCUMENTS

| | | | |
|---|---|---|---|
| 5,197,005 | A | 3/1993 | Shwartz et al. |
| 5,319,542 | A * | 6/1994 | King et al. ................. 705/27 |
| 5,570,291 | A | 10/1996 | Dudle et al. |
| 5,694,551 | A | 12/1997 | Doyle et al. |
| 5,740,425 | A | 4/1998 | Povilus |
| 5,758,327 | A * | 5/1998 | Gardner et al. ............. 705/26 |
| 5,765,138 | A * | 6/1998 | Aycock et al. .............. 705/7 |
| 5,870,717 | A | 2/1999 | Wiecha |
| 5,970,475 | A * | 10/1999 | Barnes et al. .............. 705/27 |
| 6,014,644 | A | 1/2000 | Erickson ..................... 705/37 |
| 6,055,516 | A | 4/2000 | Johnson et al. |

(Continued)

FOREIGN PATENT DOCUMENTS

WO    9802835    1/1998

(Continued)

OTHER PUBLICATIONS

Anderson, Eric Binary "Zero Latency: Wait-less Computing," ENT, Nov. 4, 1998. Retrieved from Dialog File: 16, Acc#05926954.

(Continued)

*Primary Examiner*—Mark Fadok
(74) *Attorney, Agent, or Firm*—Cha & Reiter, LLC; Stephen Gigante

(57) ABSTRACT

An inventive procurement system includes a requisition system for special item purchases that are not found when searching a catalog database. Using the requisition system the buyer is provided with the desired item while the information associated with the requisition is selectively added to a rule-based knowledge base as well as to an item database. In a preferred embodiment a common language generator has been used to normalize free form data using pre-determined rules to place the data into a class/attribute/value relationship. By having the item requisition follow the same relationship, the pre-determined rules may be updated and the free-form data associated with the item properly coded for inclusion into an item database.

20 Claims, 8 Drawing Sheets

U.S. PATENT DOCUMENTS

| | | | | |
|---|---|---|---|---|
| 6,167,383 | A | 12/2000 | Henson | 705/26 |
| 6,292,894 | B1 | 9/2001 | Chipman et al. | 713/168 |
| 6,324,534 | B1 | 11/2001 | Neal et al. | 707/3 |
| 6,338,050 | B1 | 1/2002 | Conklin et al. | |
| 6,460,034 | B1 * | 10/2002 | Wical | 707/5 |
| 6,748,376 | B1 | 6/2004 | Beall et al. | 707/3 |
| 2001/0021935 | A1 | 9/2001 | Mills | |
| 2002/0055888 | A1 * | 5/2002 | Beran et al. | 705/26 |
| 2005/0261983 | A1 * | 11/2005 | Etten et al. | 705/26 |

FOREIGN PATENT DOCUMENTS

| | | |
|---|---|---|
| WO | WO 98/02835 | 1/1998 |

OTHER PUBLICATIONS

Hornyak, Steve "The big e-payback," Management Accounting, v. 80, n. 8, Feb. 1999. Retrieved from Dialog File: 15, Acc#01775706.

Glushko, Robert et al "An XML framework for agent-based e-commerce," Communications of the ACM, v. 42, n. 3, Mar. 1999. Retrieved from Dialog File: 15, Acc# 01784429.

No author, "Help: Introduction to Object Orientation;" Nov. 20, 1997; 6pgs.

Stajano, Frank; "A Gentle Introduction to Relational and Object Oriented Databases;" ORL Technical Report TR-98-2; May 1998.

McFarland, Gregory, et al.; "Object-Oriented Database Management Systems Revisited;" DoD Data & Analysis Center for Software (DACS), Contract No. SP0700-98-4000; Dec. 18, 1997.

Zaiane, Dr. Osmar R.; "Database Management Systems;" University of Alberta; Fall 2001.

Srinivasan, V., et al.; "Object Persistence in Object-Oriented Applications;" IBM Systems Journal, vol. 36, No. 1; 1997; http://www.research.ibm.com/journal/sj/361/srinivasan.html.

* cited by examiner

Advance Search

Search in:  
[Fisher Scientific ▽]

Match:  
⦿ All Words (use AND)  
○ Any Word (use OR)

Search for: [                    ]

Select field(s) to Search:

Number of Hits to Display: [10 ▽]

- ☑ Short Description  ☐ Long Description
- ☐ Manufacturer  ☐ Manufacturer Product Number
- ☐ Category  ☐ Merchant Product Number

[ Search ]

FIG. 3

| Cat. No. | Unit / Price / Action | Material |
|---|---|---|
| 1059910 | EA / 5.51<br>Shopping Basket  Comparison List | |
| 105995 | EA / 33.11<br>Shopping Basket  Comparison List<br>PK of 3 / 99.36<br>Shopping Basket  Comparison List | Brass |

| Uncheck to Remove | Image | Product | Description | Merchant | Product Number | Manufacturer | Unit of Measure | Price | Add to Shopping Basket |
|---|---|---|---|---|---|---|---|---|---|
| ☑ | | Gases in Lecture Bottles | Gases in Lecture Bottles; Gas Ammonia; Outlet CGA 180 | Fisher Scientific | 10599A | | EA | 136.00 | Add |
| ☑ | | Gases in Lecture Bottles | Gases in Lecture Bottles Gas Carbon Dioxide Outlet CGA 170 | Fisher Scientific | 10599E | | EA | 129.00 | Add |

Refresh    Clear All

INFORMATION TRANSLATION COMMUNICATION PROTOCOL

CROSS-REFERENCE TO RELATED APPLICATIONS

This application is a divisional application of U.S. application Ser. No. 09/348,693, filed Jul. 7, 1999, now U.S. Pat. No. 6,892,185, the entire disclosure of which is incorporated herein by reference in its entirety.

FIELD OF THE INVENTION

The present invention relates in general to a procurement system. More specifically, the invention relates to a procurement system where a user completes a structured requisition form based predominantly on pre-existing normalized relationships to order an item not available in a catalog database. The form is used to specify the desired item and to selectively create updated normalized relationships for use in identifying the new item so that it and similar items may be placed in the catalog database when free form data is examined using the normalized relationships.

BACKGROUND OF THE INVENTION

Procurement systems are well known. A buyer searches a catalog or a catalog database, locates material of interest, and places an order. A supplier then fulfills the order. However, special orders greatly complicate and slow down the entire procurement process as well as greatly increasing procurement expense. In practice, a buyer who cannot find an item located in a catalog must fill out a special requisition, also known as a special order request. However, no order is even placed until a potential supplier and related cost and delivery information is provided to the buyer for consideration.

The requisition is then sent to a procurement fulfillment organization. A fulfillment specialist reviews the special requisition and manually determines if there are any potential suppliers that can fulfill the special requisition. Potential suppliers are then contacted and they respond accordingly. Each of the suppliers has their own way of describing the items it carries. Thus, the fulfillment specialist must manually review each supplier proposal and determine which ones appear to be most favorable to the buyer.

Next, the buyer must receive the best proposals from the fulfillment specialist, determine which one appears to be the most appropriate for that organization, and manually go through a special order process for the special requisition to actually be fulfilled by a supplier. Worse yet, when the special order is finally fulfilled, all of the special effort that went into manually reviewing the requisition, manually determining potential suppliers, manually locating the best suppliers, and then actually fulfilling the special order is lost. Thus, the entire process must be re-initiated if a different buyer wants the same or a similar special order in the future.

Thus, there is a strong need for a procurement system that takes into account special requisitions and resulting special orders, and uses the information related to such special orders so that the effort spent on fulfilling each order is not lost. In particular, it would be highly desirable to be able to receive a special requisition, and use a methodology to automatically select most likely suppliers without human intervention. If such an automatic selection process were available, then the special requisition could automatically be sent to each vendor for review and quoting. Moreover, it would be highly desirable to be able to receive the information from each supplier in a consistent format so that review of the received information could be automated as well according to pre-determined criteria to select the best supplier(s) for a possible special order. Additionally, it would be desirable to use the special expertise of both buyers and suppliers to create updated rules and item information associated with the special order. Therefore, future orders of the same item would not require the same special handling.

SUMMARY OF THE INVENTION

An inventive procurement system according to the present invention takes advantage of the information transferred between a buyer, a procurement fulfillment organization, hereinafter called a back office, and a supplier to automate and continuously update a catalog database of items.

In practice, a buyer searches for an item in a catalog database. If the item is not found, the user then creates a special requisition that will uniquely identify the desired item. The requisition is transmitted to the back office, which then forwards it to potential suppliers. One or more of the suppliers review and revise the requisition and send it back to the back office. The back office uses predetermined criteria to select one or more of the suppliers and then provides the buyer with the supplier information. The buyer may place an order for the special item.

A key advantage of the present invention is that both the catalog database as well as the special requisition are normalized using predetermined rules related to class, attribute, and value relationships that are already known to the back office, and must be followed by the buyer to create the special requisition. Generally, these rules are stored in a knowledge base. When the back office receives free form item data, the free form data is processed through the knowledge base to create the normalized database that a user searches. The rules used to create the normalized database are made available to the buyer to locate a specific item.

Thus, when making a special requisition for an item not in the database, the buyer first identifies the item using all available class, attribute, and value relationships used to create the normalized database. The remaining class, attribute and value relationship information required to uniquely identify the desired special item are then suggested by the buyer and forwarded to the back office.

The back office uses the pre-existing information identified by the buyer to pre-select potential suppliers that are already associated with the selected classes, attributes, and values and automatically forwards the special requisition to them. Thus, no human intervention is required.

One or more of the suppliers review and revise the special requisition using the same relationship approach as followed by the buyer and dictated by the pre-existing rules of the knowledge base and then returns it to the back office. Thus, at least two experts (i.e., the buyer and the supplier) have proposed a revised normalization relationship to uniquely identify a desired item in accordance with the pre-determined rules. The revised normalization relationship may be used to create a new rule for the knowledge base to process future items with no further human intervention.

Moreover, by having a normalized item selection process, the desired item and related items may be readily added to a catalog database for future selection by other buyers. Such an approach takes advantage of the expertise of the buyer and supplier in fulfilling a special requisition while eliminating the need to undertake the same process for other buyers. The catalog database is automatically updated as required over time, generating catalog database updating in a real time fashion.

Yet another advantage of having a normalized approach to the special requisition process is to permit easy item comparison by a buyer. When more than one potential supplier of a desired item is located, having the item information in a normalized fashion according to class, variable and value relationships provides easy comparison of the various items by the buyer. Thus, comparison-shopping is expedited to the benefit of all parties since fewer returns are likely when the item criteria are clearly understood.

BRIEF DESCRIPTION OF THE DRAWINGS

The features and inventive aspects of the present invention will become more apparent upon reading the following detailed description, claims, and drawings, of which the following is a brief description:

FIG. 3 is an example of an advanced search screen discussed with respect to the present invention.

FIG. 4 is an example of the hits located from undertaking an advanced search according to the present invention.

FIG. 6 is an example of a parametric search screen provided after a leaf class has been selected.

FIG. 7 is an illustration of a product comparison screen according to the present invention.

DETAILED DESCRIPTION OF PREFERRED EMBODIMENTS

Figure 1:
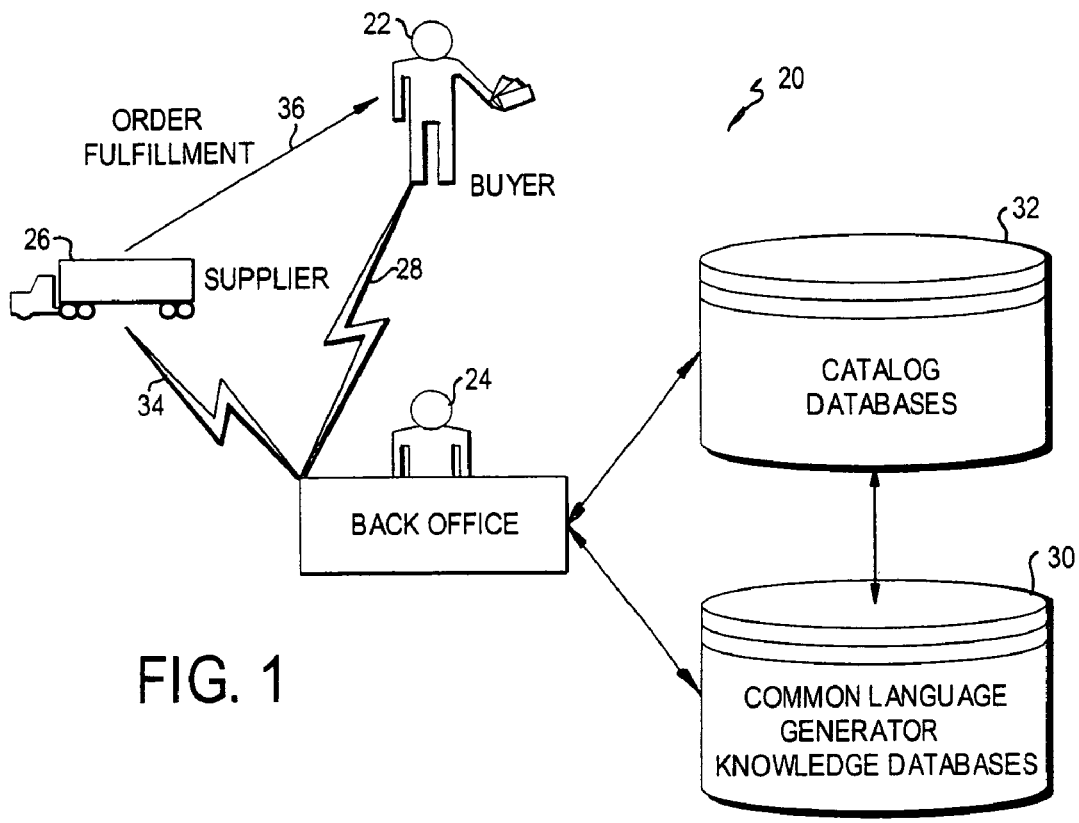
FIG. 1 is a schematic overview of key elements of the present invention including a buyer, supplier, and a back office with both the supplier and the buyer communicating with the back office.

A procurement system 20 is illustrated in FIG. 1 that includes a buyer 22, a procurement fulfillment organization hereinafter referred to as back office 24, and suppliers 26. As shown by a communications link 28, buyer 22 communicates with back office 24 to search or select item information and to place an order. To facilitate the item order process, back office 24 has one or more catalog databases 32 that are normalized using a common language generator ("CLG") and corresponding CLG knowledge base 30, discussed in greater detail below. In turn office 24 communicates with suppliers 26 as shown by communications link 34 to get information not in its catalog databases 32 or to forward an order received from a buyer 22. Then the appropriate supplier 26 or its agent ships the requested item directly to buyer 22, fulfilling the order as shown by line 36.

Figure 2:
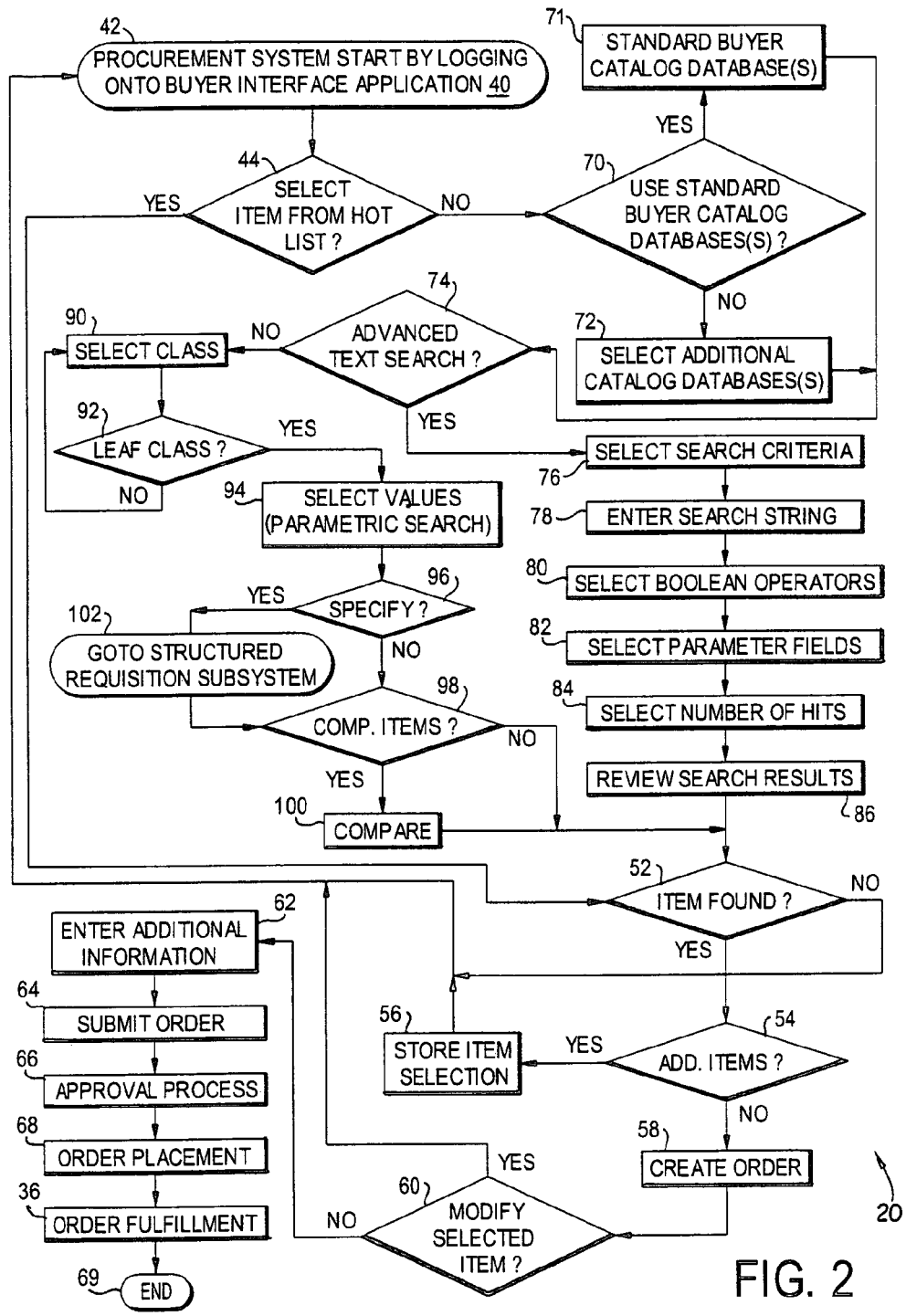
FIG. 2 is a flow chart of a procurement system according to the present invention.

Procurement system 20 is illustrated in greater detail in FIG. 2. First, buyer 22 logs onto a buyer interface application 40, described in greater detail below with respect to FIG. 10, at start point 42. Next, buyer 22 determines at decision point 44 if it will be selecting an item from a hot list. A hot list is typically a listing of items associated with a particular buyer 22 based on past purchase history or preferences. In some cases it may represent the purchase history or preferences of the buyer's organization. Unlike catalog databases 32, a hot list is typically stored within application 40 and periodically updated to take into account discontinued items and the like.

If the desired item is found in the hot list as shown at decision point 52, then the user is next asked if there are any additional items to be ordered at decision point 54. If yes, then the item selected is temporarily stored at point 56 and buyer 22 returns to start point 42 to select the next desired item. If no additional items are desired then an order is created at point 58. The option to modify the item selection is permitted at decision point 60. If an item is to be modified, then buyer 22 is returned to start point 42. Otherwise, any additional information is entered as required at point 62 and the order is submitted at point 64. In many cases, specific approval is not required if the standard buyer catalog database 32 or a hot list 44 is used. In some cases, however, an approval process is required by the buyer's organization as shown at point 66. Once the order has been approved, it is then placed by the buyer's organization as shown at point 68. Back office 24 informs one or more suppliers 26 who fulfill the order as shown by item 36, and discussed with respect to FIG. 1. The items are shipped to the buyer 22 according to buyer purchasing preferences. Finally, the procurement process ends at termination point 69.

If an item is not found using the hot list at decision point 52, additional methods for locating a desired item are available. First, the user is returned to start 42. If the hot list option is not selected, then at decision point 70 buyer 22 is asked if she will be using a standard buyer catalog database 32. If yes, then the standard database 32 is selected at point 71. Typically, a buyer accesses a standard buyer catalog database 32 that has been put together by his organization for routine purchases and that represents the purchasing preferences of the organization. If not, then additional database catalog(s) may be used as shown at point 72. One possible database is a cumulative global database representing all items tracked by back office 24 for many suppliers and buyer organizations.

Once the desired database 32 has been selected, buyer 22 may conduct an advanced text search for a desired item as shown at decision point 74 and illustrated in FIG. 3. As shown in FIG. 3, buyer 22 may refine the area of searching be selecting a category as shown at point 76, enter a search string as shown at point 78, select boolean operators such as "OR" and "AND" as shown at point 80, and even select specific parameter fields to search as shown at point 82. Finally, the number of hits to display is selected at point 84. The user then reviews the search results at point 86. An example output according to one such search result is illustrated in FIG. 4. Then the system continues at decision point 52 as discussed above. However, if an item is not located and the user chooses to search a different set of catalog databases, then again selecting advanced text search at decision point 74 will pull up the most recent search. Thus, all of the search-information does not have to be re-added.

Figure 5:
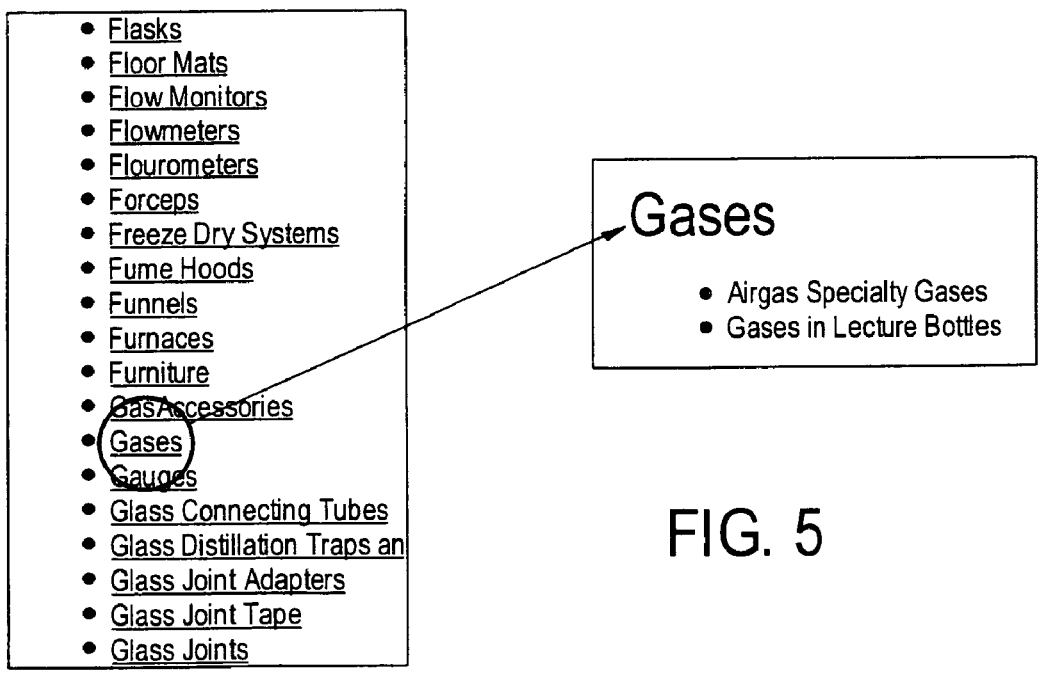
FIG. 5 is an illustration of the class hierarchy of the normalized item data according to the present invention where if gases are selected, at least two sub-classes of gases are provided.

More typically, however, a buyer 22 takes advantage of the normalization features of system 20 by navigating the organizational hierarchy of items stored within one or more databases 32 and uniquely identified using a class/attribute/value relationship rather than conducting an advanced search. Thus, if a text search is not conducted as shown at decision point 74, buyer 22 then selects item classes as shown at point 90. Buyer 22 drills down through the various item classes that are presented in a hierarchical format. As shown in FIG. 5, for example, selecting a class "gases" will present the sub-class under it. Selection of the sub-class will present the sub-sub-class and so on. The process continues as shown by decision point 92 until a leaf class (the last class in a class hierarchy) is selected.

Figure 6:
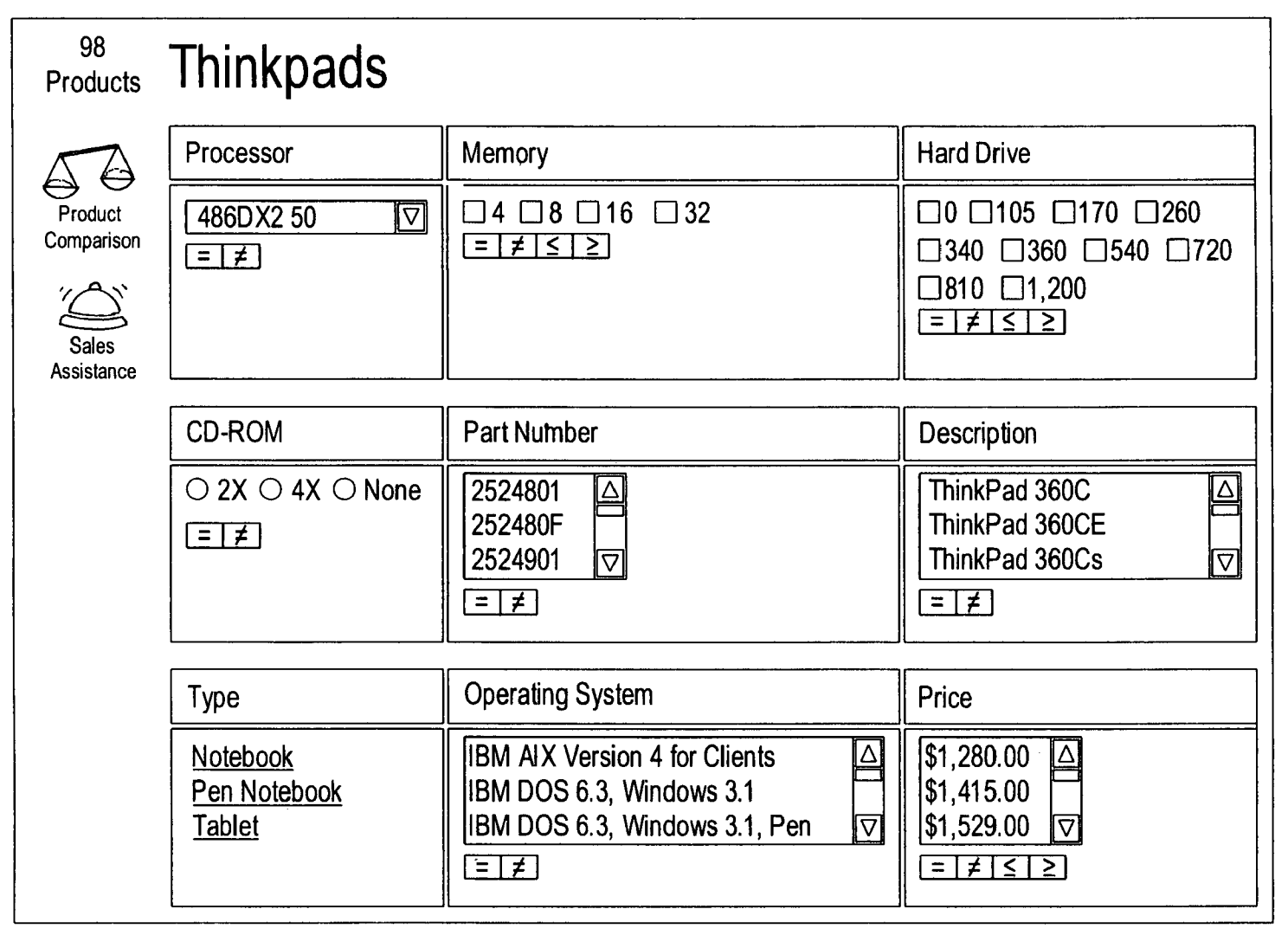

Once a leaf class is selected, a parametric search engine is presented as shown at point 94. The parametric search engine presents the attributes associated with a specific item leaf class and valid values associated with each attribute. The attributes can be presented in a variety of selection objects, such as drop-down boxes, list boxes, and sets of check boxes as shown in the example of FIG. 6. The user selects the value and clicks an operator button. Within the Parametric Search, there is an undo button that removes the value in the search for items.

Typically there are three types of attributes: static, differentiating, and dynamic. SKU represents a specific item as defined by its differentiating attributes. For example, if an item is a shirt with differentiating attributes color and size, then blue XL shirt is a SKU. Static attributes define an intrinsic property of a product and do not vary based on a SKU. A differentiating attribute is an attribute that defines the uniqueness of a SKU. A dynamic attribute is an attribute that is associated with a product dynamically at buy time.

Once buyer 22 has selected all available attribute values then the buyer must determine if additional specifying is required as shown at decision point 96. If no additional specifying is required then system 20 passes to decision point 98. At decision point 98 the use of the class/attribute/value approach permits a comparison of multiple items that meet the parametric search criteria and the selection of the item that meets the buyer's specific requirements as best illustrated in the example of FIG. 7 and shown at point 100. While not illustrated in the Figures, item comparison may also be implemented when doing an advanced text search. By using the class/attribute/value approach, a consistent and specific determination of item elements is accomplished. In practice such an approach reduces buyer confusion regarding item features and provides a listing of all values available with respect to a specific attribute of interest to a specific buyer.

As shown in FIG. 7, additional item information may be reviewed by clicking on the hyperlink associated with the specific item. Moreover, information about the merchant or supplier 26 may be determined by clicking on the hyperlink next to the item. Additional information such as item identification number, manufacturer, units of measure, and pricing is also illustrated. Then system 20 continues as discussed above at decision point 52 where the item may be selected for purchase by clicking the "Add" icon and the process continues as discussed above until the procurement process is complete. If an item is not located using the class/attribute/value relationship approach then the user is returned to start 42. As with the advance text search option, if the select class option is again selected the most recent leaf category will be provided to avoid the need to re-enter all of the search criteria.

Figure 8:
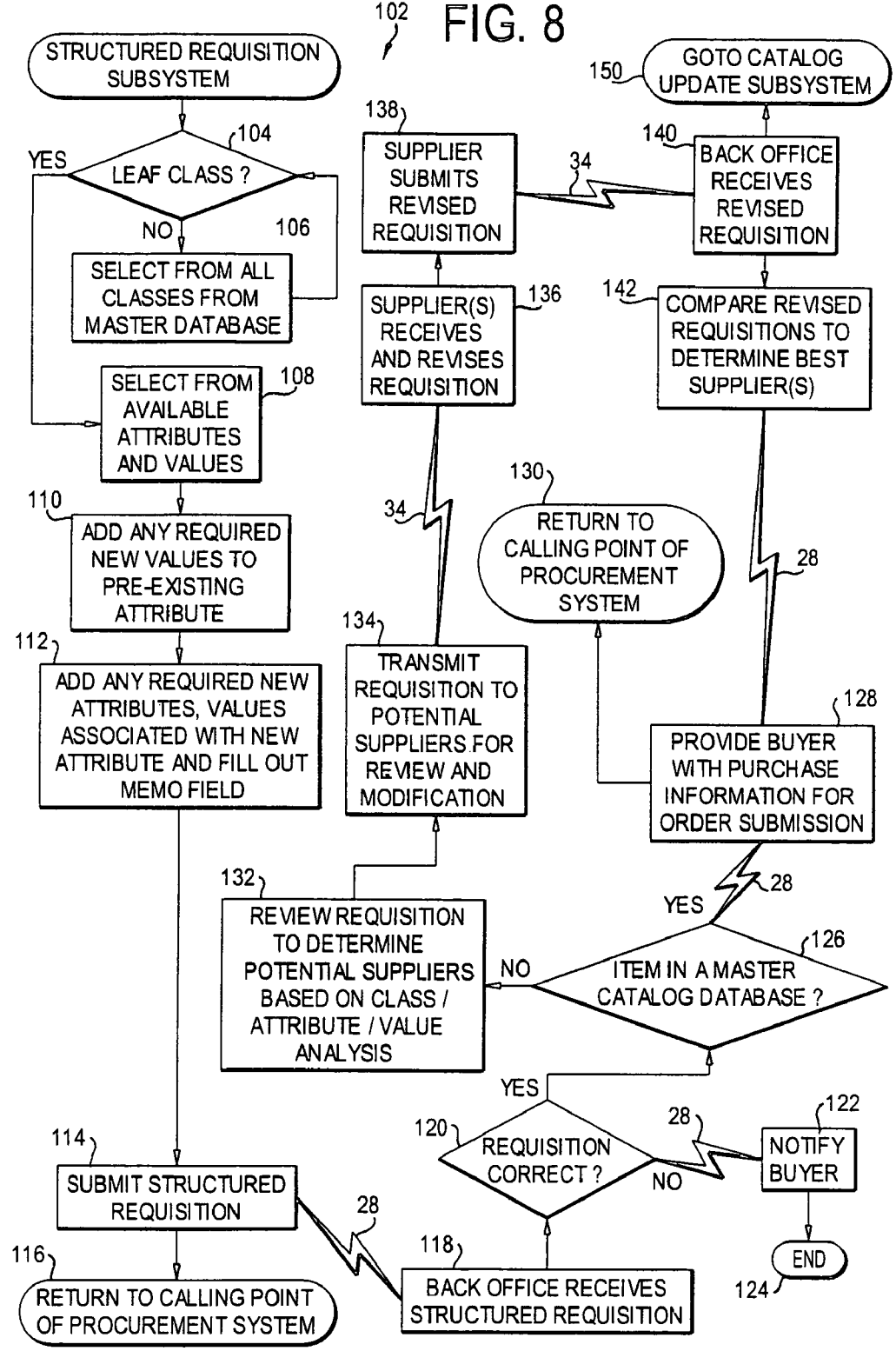
FIG. 8 is a flow chart illustrating a preferred embodiment of a structured requisition subsystem according to the present invention.

If a user desires additional specifying at decision point 96 of FIG. 2, then structured requisition subsystem 102 is invoked as shown in FIG. 8 to create a structured requisition. A key advantage of the invention is that buyer 22 has already reduced the scope of the item requisition through the familiar normalized selection process. Thus, in most cases item classes and sub-classes have likely been determined. In many cases, the classes have been determined all the way down to a leaf class. However, if the leaf class has not been selected as shown at decision point 104, then buyer 22 is provided with a revised selection screen from which she can select from available classes to further refine the item selection process as shown at point 106. Unlike in the regular procurement process, however, the classes are not limited to the specified catalog database 32. Instead all the classes from the master or global catalog database 32 are made available to the user to expedite the item location process.

If a leaf class has already been selected or once a leaf class is determined, then a modified parametric search screen with the most recently selected acceptable class is provided at point 108. Similarly, unlike the regular item selection process discussed above, the attributes and value selections are not restricted to the database 32 originally selected by the buyer 22. Instead, they include all possible attributes and values for a selected leaf class in all catalog databases 32 available from back office 24. Thus, in many cases, a user will not have to manually enter any additional information into the modified parametric search screen. However, unlike the screen shown in FIG. 6, as shown at point 110 buyer 22 has the ability to add new values for any selected attribute to better identify a desired item as shown at point 112. For example, if a faster CD ROM drive is required, buyer 22 can add the speed of the drive required as a new value. Moreover, if a required attribute, such as screen size, is missing, the buyer may be given permission to add the newly desired attribute along with a desired value. In some cases, a buyer 22 may even be able to propose a new class hierarchy.

Under all circumstances a memo field is also provided for clarification of item requirements even if a buyer 22 is limited to only proposing new attribute values.

Once the structured requisition is completed at point 114, it is submitted to back office 24 by way of communications link 28. Communications link 28 was discussed with respect to FIG. 1, above. At the same time, buyer 22 is returned back to the calling point of system 20 at point 116 so that additional items may be selected or a partial order completed.

Upon receipt of the structured requisition at point 118, back office 24 reviews the requisition to determine if it is correct as shown at decision point 120. If not, then buyer 22 is notified at point 122 by way of link 28 and the structured requisition subsystem 102 terminates at end point 124.

If the requisition is correct, then it is compared with all items in the master database 32 corresponding to the selected classes/attributes/values as shown at decision point 126. If one or more matches are found at decision point 126, communications link 28 provides the purchase information to buyer 22 for order submission at point 128. In a preferred embodiment, an electronic mail message is sent to buyer 22 with a hyperlink that will be recognized by a web browser such as Netscape® Navigator or Microsoft® Explorer. Buyer 22 clicks on the hyperlink and is routed to a screen very similar to the comparison screen of FIG. 7, where the matches may be reviewed and the desired item selected. As discussed in greater detail below, buyer 22 preferably interacts with the buyer interface application 40 and back office 24, including databases 32 using a web browser. Upon selecting the desired item, buyer 22 is preferably immediately reinserted back into procurement system 20 as shown at point 130, returning to point 98, so that the purchase process may be completed.

A key advantage of the present invention occurs if the desired item is not in the master catalog database 32. At point 132 the structured requisition is automatically reviewed by back office 24 using the class/attribute/value information and normalized database information at its disposal. Based on the information provided by the buyer 22, automated systems of back office 24 route the structured requisition to potential suppliers as shown at point 134 using communications link 34. Communications link 34 was first discussed with respect to FIG. 1. Back office 24 knows the suppliers associated with particular classes and sub-classes of goods and can often fine-tune a requisition submission to very specific suppliers based on attributes and values provided within the structured requisition.

In a preferred embodiment, an electronic mail message is sent to potential suppliers again using hyperlink and web browser technology, as discussed above. Preferably, as discussed further below with respect to FIG. 10, supplier 26 interacts with a supplier interface application 135 using a web browser. As each supplier receives message at point 136, it clicks on the hyperlink and is brought to a screen where the structured requisition is provided within application 135. The supplier 26 may provide additional class/value/attribute information to better classify the item based on the specialized knowledge of the supplier and the items within its inventory. If the supplier has an item that it believes will meet the buyer's structured requisition criteria, it then submits a revised requisition as shown at point 138 that is then transmitted back to back office 24 by way of communications link 34 as shown at point 140. The revised requisition includes all of the item related information required by buyer 22 to make a purchasing decision. Under some circumstances portions of application 135 may even be part of back office 24, but the supplier 26 still requires some type of interface application such as a web browser.

Typically, all suppliers 26 receiving a structured requisition are given a predetermined amount of time to provide a revised requisition. When either the time for replying expires or all pre-selected suppliers provide a revised requisition, then at point 142 back office 24 compares the revised requisitions to determine the best supplier or suppliers for the specific buyer 22. Back office 24 uses a wide range of objective and subjective criteria to determine the best supplier(s) including geographic location, price, reputation, timeliness, and the like. Often, the criteria include those predetermined by the buying organization based on its specific requirements or desires. As a result, the wishes of the buying organization are automatically considered to expedite the purchase process and reduce both cost and inconvenience.

Once one or more items are screened as best meeting the needs of buyer 22, they are then provided to the buyer as shown at point 128, and discussed above.

As shown in FIG. 8, structured requisition subsystem actually forks at point 140. The first fork has been discussed above. However, the second fork, related to catalog update subsystem 150, is discussed in more detail in FIG. 9.

The use of a normalized parametric search has been discussed above. Every item in a catalog database is normalized in terms of class hierarchy with a final leaf class being followed by a series of attributes and attribute values. As a result of the normalization process, item determination and searching is greatly enhanced. When undertaking a structured requisition, the same normalized data is used to the extent that it is available to buyer 22. A specialized supplier having expertise with respect to the class/attributes/values with which a requisitioned item is associated then further refines the structured requisition. Thus, both a knowledgeable buyer 22 and a knowledgeable supplier 26 are providing normalized relationships between an item and its defining characteristics. The relationships are used to provide selective rule updates to the common language generator knowledge base 30 and to an associated catalog database 32 using the predetermined rules of the knowledge base, as updated from time to time, to convert raw or free form data into the preferred normalized format. Thus, once a catalog database 32 is established, the catalog database is continuously fine-tuned by suppliers, buyers, and changing market conditions of which both are aware.

While a separate knowledge base 30 is illustrated, it is possible to bypass the knowledge base 30 completely and update a database 32 directly, so long as the class/attribute/value relationships are maintained. An advantage of using a separate knowledge base 30, however, is where one or more new rules are specified that are later available to be able to normalize free form data.

Figure 9:
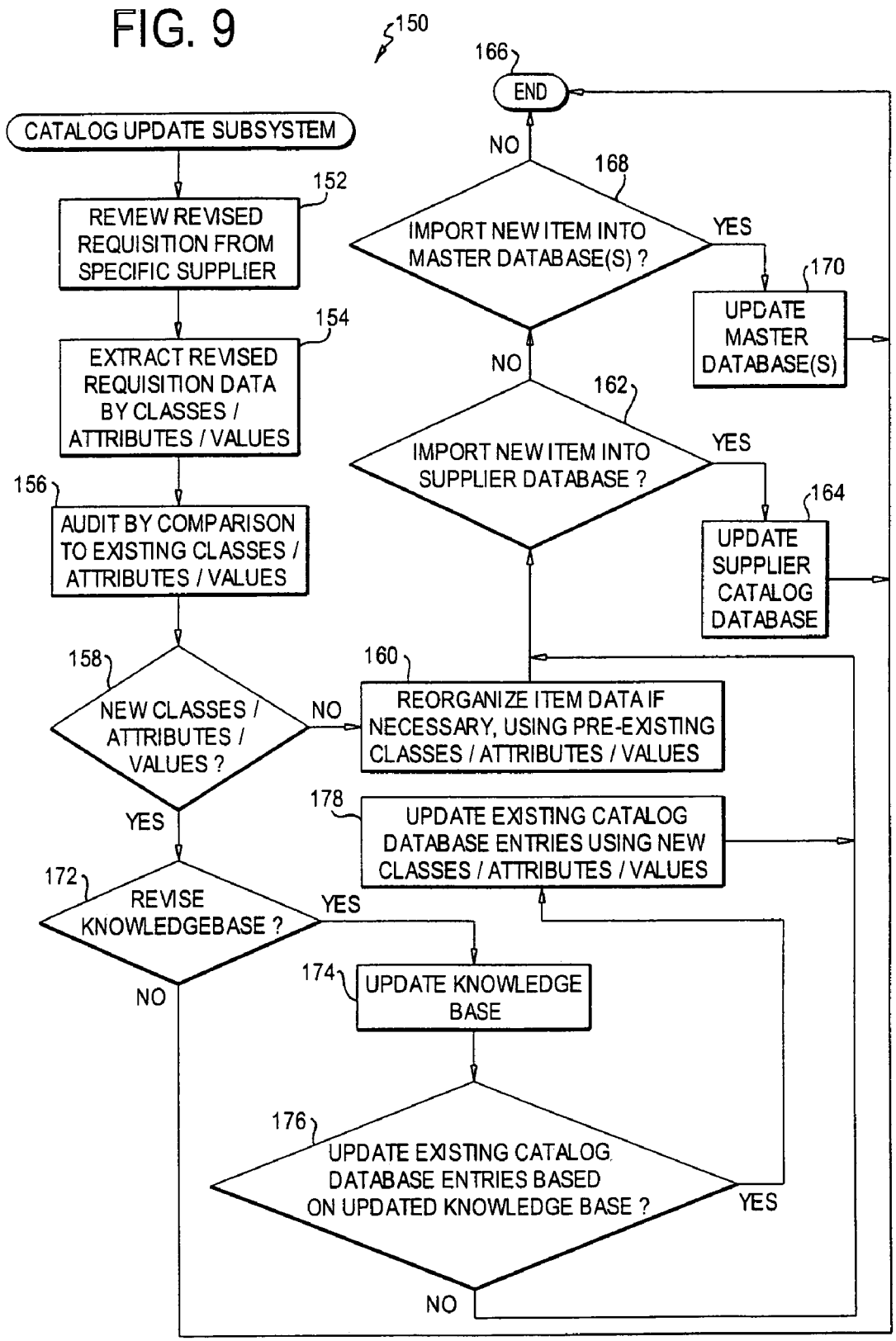
FIG. 9 is a flow chart illustrating a preferred embodiment of a catalog update subsystem according to the present invention.

As shown in FIG. 9, when a revised requisition is received from a specific supplier, the revised requisition is reviewed at point 152. The class/attribute/value relationships are extracted from the revised requisition and audited by back office 24 at point 154. The information is audited at point 156 by comparing it to existing class/attribute/value relationships to determine if the common language generated knowledge base requires one or more new predetermined rules with a subsequent refreshing to the catalog database of the updated information available for the item. Preferably, the information of several revised requisitions corresponding to a single structured requisition is compared to determine normalized consistency among various suppliers. Once the audit is completed, a determination is made at decision point 158 as to whether updated classes/attributes/values are required for the requisitioned item. If not, then the revised requisition is refined using pre-existing class/attribute/value information as shown at point 160. Then at decision point 162 the determination is made as to whether the requisitioned item should be imported into the supplier database associated with the specific supplier 26. If yes, then the supplier catalog database 32 is updated at point 164 using the updated information associated with the item and the sub-system then ends at termination point 166. If the supplier database 32 is not updated, then at decision point 168 the decision is made whether to import the requisitioned item into the master database(s) 32. If yes, then the master catalog database(s) are updated at point 170 using the updated information associated with the item. While not illustrated in the figure, the same approach may be used to update the standard buyer catalog database 32 instead of or in addition to the master database 32, if so desired. However, once the appropriate catalog database is updated, if any, sub-system 150 then ends at termination point 166.

Catalog database 32 has been designated fairly generically. The database 32 may be a separate database of items from a specific supplier. Alternatively it may be a composite database. When acting as a composite database, it may represent items from multiple suppliers that can be organized for and based on the buying habits of a single buying organization (e.g., the standard buyer catalog database discussed above) or upon the buying habits of a group of related buying organizations (e.g., as in hospitals aid doctors' offices that are members of a group purchasing organization). Therefore, when a database 32 is updated, it may be any one or a combination of databases 32 depending on the desires of the supplier buyer 22 or her buying organization, suppliers 26, and back office 24.

At decision point 158 if the decision is made that the normalized information associated with the revised requisition is new, then the determination must be made whether to revise the common language generated knowledge base at decision point 172. If the decision is made not to update the knowledge base then sub-system ends at termination point 166. On the other hand, if the decision is made to update the knowledge base then it is updated with the new information at point 174. Then the decision must be made at point 176 whether to update existing catalog entries based on the updated knowledge base. If yes, then the entries are updated at point 178 using the updated normalized information that can be associated with the raw or free form item data associated with each entry. If no, then the entries are not updated. Then subsystem moves on to decision point 162 as discussed above.

Figure 10:
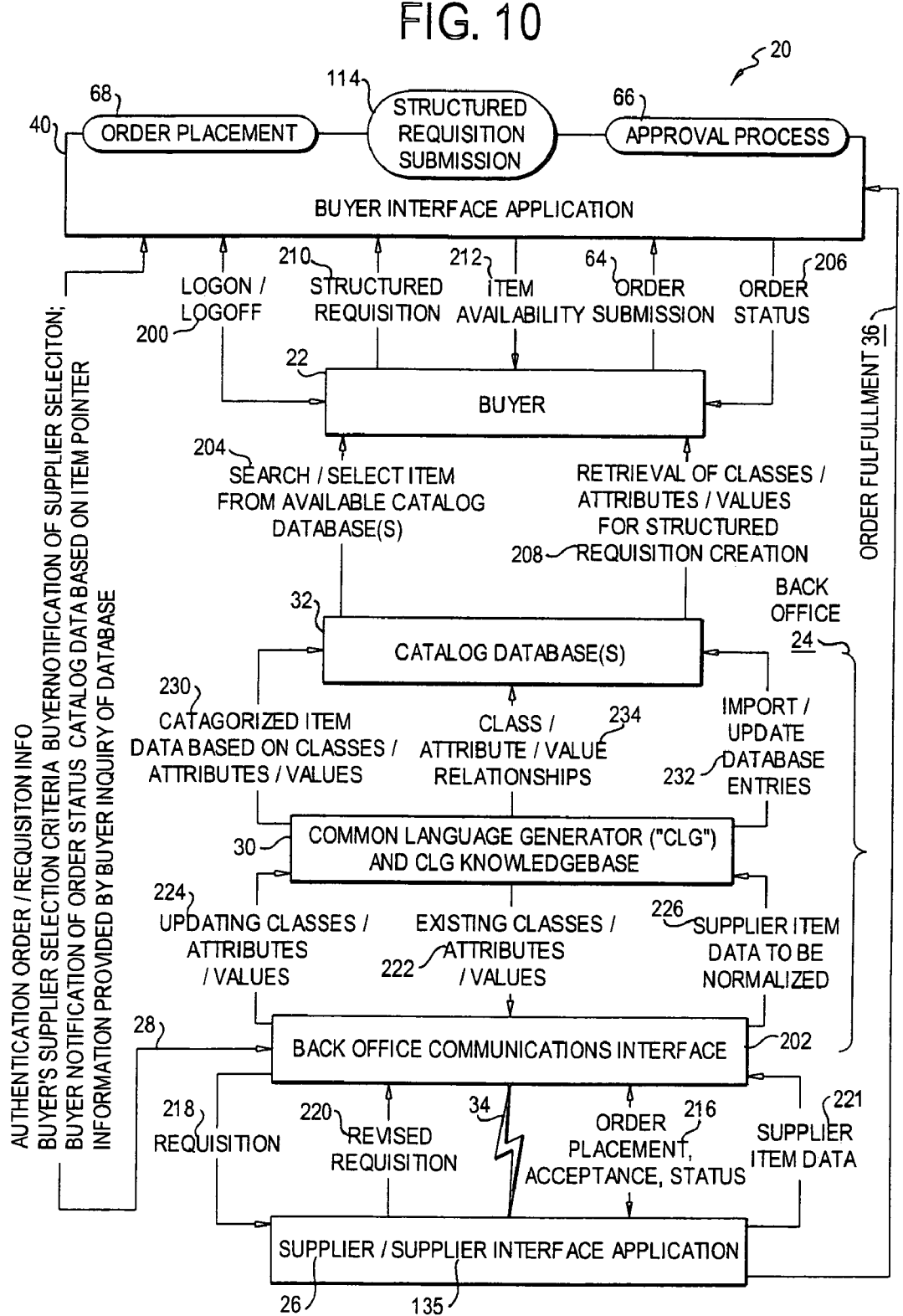
FIG. 10 is a representation of the relationships between the various elements of the present invention including the buyer, buyer interface application, back office (including catalog database, common language generator and knowledge base, and back office communications interface), and supplier/supplier interface application.

The system based interaction between buyer 22, back office 24, and supplier 26 is explained in greater detail in FIG. 10. As shown in FIG. 10, buyer 22 interacts with a buyer interface application 40. Preferably, the interface is web based, permitting a buyer 22 to interact with application 40 using a standard web browser such as Netscape® Navigator or Microsoft® Explorer. Buyer 22 logs on and off from the browser to application 40 as shown by line 200. In turn the log on information is authenticated with a back office communications interface 202 as shown by communications link 28. As illustrated, besides authentication information, order placement information, structured requisition information, the buyer's supplier selection criteria, supplier availability, buyer notification or order status and the like is also communicated by way of communication link 28 between application 40 and interface 202. Even catalog data base information stored based on pointers provided by direct buyer inquiry to a database 32 may be sent using communications link 28.

After buyer 22 logs on, item selection is accomplished using a hot list, advanced text searching, class/attribute/value selection, or a structured requisition request as discussed above. The item selection process requires that a catalog database 32 be queried for information directly by buyer 22 as shown by line 204. An order submission is made as shown by line 64 and discussed above, that is passed to application 40 from buyer 22. Any required approval process is shown by item 66 and an order placement made after any approvals is shown by item 68, both of which were discussed above. Once an order is placed, order status may be passed from interface 202 to application 40 and then to buyer 22 as shown by line 206 until the order is fulfilled by a supplier 26.

If a structured requisition is required, the complete listing of available classes/attributes/values is retrieved from the master or global catalog database 32 as shown by line 208. The structured requisition is passed from buyer 22 to application 40 by line 210 where the structured requisition is submitted as shown at point 114, much as if it were an order. Alternatively, the information may be passed directly from buyer 22 to back office 24 by way of communications link 28. If one or more items is located using structured requisition subsystem 102, the information regarding item availability is typically passed from back office communications interface 202 to application 40. Next, the information is passed to buyer 22 in the form of an electronic message with a link pointing buyer 22 to a server with the desired item information. The hyperlinked information may be within back office 24 or transferred directly to application 40 as desired.

As shown in FIG. 10, buyer 22 has direct access to one or more catalog databases 32 that are not stored within buyer interface application 40. However, as shown by communications link 28 and discussed above, appropriate authentication is required before a user can access the catalog databases 32, requiring the use of the communication link 28 between buyer 22, application 40 and back office 24 with database 32. Once authentication is completed, buyer 22 can access database 32 as shown. As noted above, application 40 can also directly access database 32 by way of communications link 28 for database data corresponding to an item selected by a buyer 22 so that an order may be completed. The data elements transferred must be sufficient to 1) describe and identify the item including the normalized classes/attributes/values, part number, description, and 2) provide sufficient information to source the item, including vendor, cost, price, price history, and price expiration date. Typically, the data elements are transferred using pointer information provided by the inquiry of the database 32 by a buyer 22.

As shown in FIGS. 1 and 10, back office 24 itself is broken into a number of components. It includes catalog databases 32, back office communications interface 202, and the common language generator and CLG knowledge base 30. Each of the components can readily communicate with each other. For data transfer, a preferred mode of communication includes Extensible Markup Language ("XML"), which is a subset of the Standardized General Markup Language ("SGML"). HyperText Markup Language ("HTML") is appropriate for small data transfers between various portions of procurement system 20.

In general, interface 202 is used to communicate with buyer 22 by way of application 40 as noted above. However, when accessing catalog databases 32, buyer 22 can preferably bypass buyer interface application 40 as long as authentication has been completed. Interface 202 is also used to communicate with supplier 26. As shown by line 216 all order placement, acceptance, and order status information is shared between interface 202 and supplier 26. When structured requisition subsystem 102 is being used, interface 202 provides the structured requisition as shown by line 218 and receives a revised requisition as shown by line 220. Supplier item data is shown by line 221. Each of these lines comprises a portion of communications link 34 shown in FIG. 1.

Supplier 26 has only limited contact with buyer 22 as shown in both FIGS. 1 and 10. The only direct contact between the two parties is when supplier 26 or its agent completes order fulfillment as shown by line 36.

Interface 202 uses information it receives from both buyer 22 and supplier 26 to selectively update catalog databases 32 as discussed with respect to catalog update subsystem 150 in FIG. 9.

Knowledge base 30 is the glue that relates an item selection process with the items actually stored within a database 32. It is formed using pre-determined rules that have been established over time that relate items to class/attribute/value characteristics or relationships. These pre-determined relationships are pulled from CLG knowledge base 30 as shown by line 222 to be compared with potential classes/attributes/values received from supplier 26 as shown by line 220. Selective updating of the rules governing knowledge base 30 is shown by line 224. Line 226 represents the free form supplier item data to be normalized and then loaded into a database 32. The data is normalized using the class/attribute/value relationships that govern the common language generator and knowledge base 30.

Once the supplier data has been normalized using the class/attribute/value relationships of the CLG knowledge base 30, it is sent to an appropriate database 32 as shown by line 230 where the database entries are either imported or updated as shown by line 232. The complete listing of all class/attribute/value relationships used by CLG knowledge base 30 are also contained within databases 32 and transferred from the knowledge base as shown by line 234. These relationships are used to undertake parametric searching and item specifying as discussed above. The class/attribute/value relationships are then updated when required as discussed above with respect to FIG. 9.

The disclosed embodiments and examples are given to illustrate the present invention. However, they are not meant to limit the scope and spirit of the present invention. Therefore, the present invention should be limited only by the appended claims.

What is claimed is:

1. A computerized system for comparison-shopping comprising:
a back office apparatus that includes machine readable code on a computer readable medium for execution by said back office apparatus;
at least one catalog in communication with said back office apparatus having a computerized database of items, said at least one catalog being organized according to a pre-determined item classification standard by a class, attribute, and value elements of a classified item in a normalized database, wherein at least one class of items including at least one item, and a Common Language Generator (CLG), wherein said at least one catalog database being normalized by said (CLG), and
at least one supplier electronically linked for communication with said back office apparatus;
wherein said back office apparatus includes query means comprising a search display screen for searching the at least one catalog database and locating at least one potential supplier therefrom based on item requirement information provided in a special requisition; means for electronically sending a request for a quote that includes information from the special requisition, to the at least one potential supplier and for receiving responses including product availability information for items and classes of items corresponding to the special requisition that are available from said at least one potential supplier; and means for automated comparison-shopping of the responses and for automatically selecting a source.

2. The system of claim of claim 1, wherein said means for electronically sending a request for a quote comprises items included in the special requisition that are not found in said at least one catalog database.

3. The system of claim 1, wherein said means for electronically sending a request for a quote comprises items included in the special requisition that are found in said at least one catalog database.

4. The system of claim 3, wherein said means for electronically sending a request further includes items included in the special requisition that are not found in said at least one catalog.

5. The system of claim 1, wherein the special requisition comprises product requirement information using the pre-determined item classification standard.

6. The system of claim 5, wherein: said responses comprise product availability information using the pre-determined item classification standard; and said means for automated comparison-shopping of the responses from the at least one potential supplier comprises a pre-determined supplier quote evaluation and selection operation based on the pre-determined item classification standard.

7. The system of claim 1, wherein said back office apparatus utilizes the pre-determined item classification standard for locating potential suppliers that match the requirements of the special requisition.

8. The system of claim 7, wherein said means for sending and receiving comprises a communications network.

9. The system of claim 8, wherein said means for comparison-shopping accumulates, for a pre-determined period of time, the responses from the at least one potential supplier and select as a source at least one of the at least one potential supplier based on pre-determined source selection criteria applied to the accumulated responses.

10. The system of claim 9, wherein said communication network comprises the Internet and each of said means for searching, means for sending and receiving, and means for comparison-shopping is included in a web-browser plug-in that communicates over the Internet to search said catalog database, respectively send and receive said request and responses, and select said at least one supplier.

11. The system of claim 1, wherein said special requisition includes a new class and associated item information and said means for searching locates a similar class based on pre-determined similarity criteria.

12. The system of claim 7, wherein said special requisition includes at least one new class and associated item information and said back office locates a similar class based on pre-determined similarity criteria.

13. A method for automated comparison-shopping, comprising the steps of:
providing at least one computerized catalog database of items supplied by at least one supplier electronically linked for communication with a back office apparatus including machine readable code on a machine readable medium executed by said back office apparatus, said at least one catalog organized in accordance with a pre-determined item classification standard by a class, attribute, and value elements of a classified item in a normalized database that includes at least one class of items having at least one item supplied by said at least one supplier;
locating a potential supplier in the at least one catalog database by performing a search of the at least one catalog database by using the item requirement information provided in a special requisition and pre-determined similarity criteria provided by a Common Language Generator (CLG) having a knowledge base comprising a predetermined set of rules and relationships, wherein said at least one catalog database being normalized by said (CLG);
sending by the backoffice apparatus a request for a quote that includes the special requisition to the located at least one potential supplier; accumulating, for a given period of time, responses to the request sent to the located at least one potential supplier;
comparing by a backoffice apparatus the accumulated responses in accordance with pre-determined selection criteria to identify a best response and the supplier; and
automatically selecting by the backoffice apparatus the supplier of the best response as a source for the special requisition based on the comparison.

14. The method of claim 13, wherein said request comprises items included in the special requisition that are found in said at least one catalog database.

15. The method of claim 13, wherein said request comprises items included in the special requisition that are not found in said at least one catalog database.

16. The method of claim 15, wherein said request further comprises items included in the special requisition that are found in said at least one catalog database.

17. The method of claim 16, wherein said special requisition comprises product requirement information using the pre-determined item classification standard.

18. The method of claim 13, wherein: said responses comprise product availability information using the pre-determined item classification standard; and said comparing step further comprises the step of using a pre-determined supplier quote evaluation and selection procedure based on the predetermined item classification standard.

19. The method of claim 13, wherein said locating step further comprises the step of using the predetermined item classification standard to locate potential suppliers that match the requirements of the special requisition.

20. The method of claim 13, wherein: said sending step further comprises sending the request over a communications network; and said accumulating step further comprises receiving responses over the communications network.

* * * * *